July 23, 1968

T. J. CARR ETAL

3,394,368

SIGNAL SWITCHING SYSTEM AND CONTROL
KEYBOARD SUITABLE FOR USE THEREIN

Filed April 1, 1964

INVENTORS:
THOMAS J. CARR
LEONARD FINKEL

BY Howson & Howson

ATTYS.

INVENTORS:
THOMAS J. CARR
LEONARD FINKEL

July 23, 1968

T. J. CARR ETAL

3,394,368

SIGNAL SWITCHING SYSTEM AND CONTROL
KEYBOARD SUITABLE FOR USE THEREIN

Filed April 1, 1964

INVENTORS:
THOMAS J. CARR
LEONARD FINKEL

BY Howton & Howton
ATTYS.

United States Patent Office 3,394,368
Patented July 23, 1968

3,394,368
SIGNAL SWITCHING SYSTEM AND CONTROL
KEYBOARD SUITABLE FOR USE THEREIN
Thomas J. Carr, Huntington Station, N.Y., and Leonard
Finkel, Cherry Hill, N.J., assignors to American Bosch
Arma Corporation, Garden City, N.Y., a corporation
of New York
Filed Apr. 1, 1964, Ser. No. 356,368
8 Claims. (Cl. 340—365)

ABSTRACT OF THE DISCLOSURE

A control keyboard containing a replaceable, reversible magazine of different legend-bearing plates each actuatable automatically to a visible position to identify the functions of associated control switches when a corresponding function switch is operated. Coding members on the magazine and on the plates provide control signals indicating which magazine, in which orientation, is in the keyboard and which plate is actuated to visible position at any time, and these control signals are used to control selection of the data displayed under control of the keyboard.

---

This invention relates to systems employing a control keyboard for controlling the application of different signals to a signal utilization device, such as a computer or data-presentation display, and also to keyboard structures for use therein.

Systems are known in the prior art in which a number of controlled transfer elements, which in the aggregate may be designated as a transfer matrix, are supplied with a plurality of signals and selected ones or groups of these signals are transferred by the matrix to a signal utilization device under the control of an operator. Typically the operator is provided with a keyboard having a plurality of control switches thereon so that the operator, by actuating one of the control switches, can cause the transfer of any one or group of input signals to the signal utilization device, at will.

One manner in which this can be accomplished is to provide on the keyboard a number of control switches equal to the number of controlled transfer elements in the transfer matrix, each control switch on the keyboard being electrically connected to a different one of the elements in the matrix. However, where the matrix contains a large number of controlled transfer elements such an arrangement requires a correspondingly large number of control switches on the keyboard.

To minimize the number of switches required on the keyboard it has been proposed in the prior art to use a number N of control switches on the keyboard, where N is an integer greater than one and less than the number K of transfer elements in the matrix, and to provide also on the keyboard a multi-position selector switch having a number of positions M such that the product N times M is equal to or slightly greater than the number K of transfer elements. Typically each transfer element in the matrix was connected to a different one of the control switches on the keyboard, and to the selector switch in only a particular one of its positions. A different one of the transfer elements was therefore actuated for each of the N times M possible combinations of one of the control switches with one of the selector switch positions. For example, if there were eighty transfer elements in the matrix, twenty control switches and four positions for the selector switch on the keyboard would be adequate to provide separate control of each of the eighty transfer elements.

The latter general type of keyboard arrangement and connection is primarily of interest in applications in which the controlled transfer elements in the transfer matrix fall into a number of groups according to the different classes of input signals thereto. For example, where eighty transfer elements are utilized, twenty of them may be separately supplied with twenty different signals representing accumulated monthly sales of a product in twenty different cities; another twenty of the transfer elements may be separately supplied with twenty different signals representing test results as to twenty different performance factors of a product under test; another twenty may be separately supplied with twenty different signals representing stock market quotations as to twenty different stocks; and the remaining twenty may be supplied with twenty different signals representing air temperature in twenty different regions of the country. In such a case the operator is ordinarily interested in only one of the four classes of information at a time. Hence the operator would normally turn the four-position switch to that one of its four positions corresponding to the class of information in which he is then interested, and operate sequentially the various ones of the twenty control switches which cause selective transfer of the detailed data of that class to the computer, data-presentation display or the like constituting the signal utilization device.

However, because each of the N control switches on the keyboard is used for M different functions at different times, there arises the problem of properly labelling the control switches with appropriate identifying indicia or legends. It will be understood that the keyboard should be provided with appropriate legends adjacent the various control switches so that the operator can easily see which control switch to press in order to accomplish transfer to the signal utilization device of the intelligence-representing signal in which he is then interested. One way in which this can be accomplished is to provide M different overlays or cutouts, each bearing a set of legends suitable for location next to the control switches for a different one of the M functions of each control switch. For each of the M positions of the selector switch a different one of these overlays would be applied to the keyboard top, so that a proper legend would be presented adjacent each control switch. While workable, such a system is of course an inconvenience and hindrance to the operator.

Accordingly it is an object of the invention to provide a new and useful signal switching system.

Another object is to provide new and useful improvements in signal switching systems of the type in which a plurality of input signals are supplied to a signal utilization device by way of a plurality of controlled transfer elements, which transfer elements are controlled by a set of manually-operable control switches so that an operator may operate the control switches to determine which of the input signals are supplied to the signal utilization means at any time, wherein said control switches are utilized for different sets of functions at different times as determined by function-selecting switch means, said improvements serving automatically to provide proper identifying indicia adjacent each control switch regardless of which of its different functions it is performing at a given time, and preferably also serving to provide to the signal utilization device signals indicative of which of the several functions is being provided by the control switches at a given time.

A further object is to provide a new and useful control keyboard of a type having therein a plurality of switch-actuating elements for a corresponding plurality of control switches, which switches perform different sets of functions at different times.

It is also an object to provide a control keyboard in which each of a plurality of control switches thereon serves a different function depending upon the state of a second set of function-selecting switches, and in which indicia associated with each of the control switches are automatically changed appropriately when the state of the function-selecting switches is changed.

It is also an object to provide such a keyboard which is compact and simple in operation and structure.

Another object is to provide such a keyboard having rear lighting for the indicia and providing differently colored fields for different sets of indicia.

Still another object is to provide a new and useful mechanism for automatically operating such a keyboard.

These and other objects and features of the invention are realized by the provision of a control keyboard which comprises a masking structure having a plurality of transparent regions therein arranged in a predetermined pattern. A plurality of electrical control switches are also provided on the keyboard, each of these switches having its actuating element disposed in association with a different one of the transparent regions. Disposed behind the masking structure are indicia-bearing means having a plurality of sets of indicia thereon. The sets of indicia-bearing means are selectively positionable to expose any desired one of the sets to the view of the operator through the transparent regions while the other sets of indicia are obscured from view by the masking structure. Also provided, preferably on the keyboard, are a plurality of function-selector switches, operation of any one of which function-selector switches automatically positions said indicia-bearing means so as to expose through said transparent regions that set of indicia appropriate to the function associated with the operated selector switch. The same operation of the selector switch preferably serves to change the electrical function of the control switches to that one corresponding to the set of indicia simultaneously exposed through the transparent regions. Preferably also, the operation of any one of the function-selector switches produces a signal which is transmitted to the signal utilization device to indicate which function selector is actuated, to modify the characteristics of the signal utilization device, or to accommodate it to reception of input signals corresponding to the selected function.

The control switches and the function-selector switches preferably are connected to a matrix of controlled transfer elements in such manner that each of the transfer elements is actuated to supply to an input signal to the signal utilization device only upon the actuation of one particular combination of function-selector switch and control switch. The transfer elements are preferably classifiable into a number of sets M equal to the number of function-selector switches, each set being connected to a different selector switch, there being N controlled elements in each set and N corresponding control switches therefor, so that $N \times M$ elements are controlled by $N+M$ switches.

Accordingly, an operator who wishes to present to the signal utilization device information-representing signals corresponding to data of a particular class need only actuate the function-selector switch corresponding to that class of data and then operate in sequence any or all of the control switches to supply to the signal utilization device signals representing the particular data in which the operator is interested, the nature of these data being indicated by proper visible indicia automatically presented at positions associated with corresponding actuating elements of the control switches; these indicia are automatically changed to a proper set upon each actuation of each selector switch, and the signal utilization means is preferably automatically supplied with a signal indicative of which selector switch is actuated.

Further features of the invention relate to the keyboard construction by which these functions are provided. In this aspect of the invention, the keyboard preferably comprises a masking element, which may be a top-opening door on the keyboard, which contains the plurality of transparent regions arranged in a predetermined pattern mentioned above. A plurality of control-switch actuating elements are disposed in association with different ones of the transparent regions, and on the side of the masking element opposite the operator there is provided a stack of plates preferably having their major surfaces generally parallel to each other and to the plane of the masking element. Each of these plates bears thereon a pattern of indicia corresponding to the pattern of the transparent regions in the masking structure, so that when any given plate is suitably positioned a proper set of indicia will be made visible through the transparent regions for one of the functions which the control switches are to perform. The different plates bear different sets of indicia, each plate bearing a set of indicia appropriate to a different one of the switch functions.

The pattern of the transparent regions in the mask and of the indicia on the plates, as well as the size of the area between the transparent regions of the mask, are preferably such that any set of indicia on a given plate is normally masked from view by the opaque material between the transparent regions of the mask but can be rendered visible by moving its associated plate parallel to the plane of the mask by an amount less than the distance between the adjacent transparent regions. The position of the plate for which its indicia are invisible will be referred to herein as its cleared position, and the position in which its indicia are visible through the transparent regions in the mask will be referred to hereinafter as its visible position.

At least all but the rear-most of the stacked plates are also provided with transparent regions, which may be apertures, and which are aligned with the transparent regions of the mask when each plate is in its cleared position. Means are then provided which respond to operation of a particular one of the function-selector switches to urge a particular one of the indicia-bearing plates from its cleared position to its visible position. This is preferably accomplished by a mechanism which engages and pulls a particular corresponding plate from its cleared to its visible position in response to depression of the actuating element of a particular function-selector switch.

In one preferred embodiment a pair of electrical switch contacts are also provided on each of the function-selector switches, each pair of contacts being actuated between their open and closed positions in response to actuation of the corresponding function-selector switch thereby to produce an electrical indication of which selector switch is operated, which electrical indication as described above may be supplied to the transfer matrix and also to the signal utilization device. In some embodiments of the invention the electrical switch contacts actuated by the function-selector switches are actuated directly by the selector switch mechanisms themselves, while in other embodiments the contacts are actuated indirectly by the motion of the particular indicia-bearing plate which is moved by a given selector switch. The function-selector switch mechanism also preferably includes latching, spring-biasing and interlocking means such that initial operation of a function-selector switch will first return any plate which is in its visible position to its cleared position and further operation thereof will move the newly-selected plate to its visible position. The selector switch is automatically latched in its fully-actuated position until release by later initial operation of another selector switch.

In accordance with a further feature of the invention in a preferred form thereof, the stacked plates are held in a magazine, and the keyboard and magazine construction is such that different magazines containing different types of indicia-bearing plates can readily be substituted into the keyboard when desired, the plates being affirmatively held in fixed position in the magazine when out of the keyboard.

According to another feature, each magazine is provided with an individual identifying coding structure which cooperates with a code-reading device on the keyboard so as to provide electrical indications of which magazine is in the keyboard at any given time. This magazine-identifying signal is preferably utilized in applications in which the transfer matrix comprises more than one aggregate of controlled transfer elements, each aggregate containing transfer elements corresponding to indicia on plates in different magazines, the magazine-identifying signals then being used to render operative only a corresponding one of said aggregates. Preferably the magazine-identifying signal is also supplied to the signal utilization device for example to control the operation or characteristics thereof.

In certain of its forms the invention also contemplates the use of identifying coding elements on the individual plates themselves, together with appropriate code-reading means on the keyboard for producing signals indicative of the coding of that plate which is in its visible position, which signal is preferably supplied to the matrix of controlled elements in lieu of the selector-switch signals and the magazine-identifying signals, and/or to the signal utilization means to control operations therein.

A further feature utilized in certain forms of the invention relates to the use of a plate-containing magazine which can be reversed in position in the keyboard to make use of indicia presented on both sides of the plates in the magazine, together with electrical coding arrangements for producing signals indicative of which of the two alternative positions of the magazine is being utilized at a given time.

Further novel features employed in various preferred embodiments of the invention relate to provisions for using differently-colored plate members, to provisions for rear lighting of the indicia, and to various mechanical features by which the effectiveness, simplicity and reliability of the keyboard are improved.

Other objects and features of the invention will be more readily appreciated from a consideration of the following detailed description taken in connection with the accompanying drawings, in which.

Figure 1:
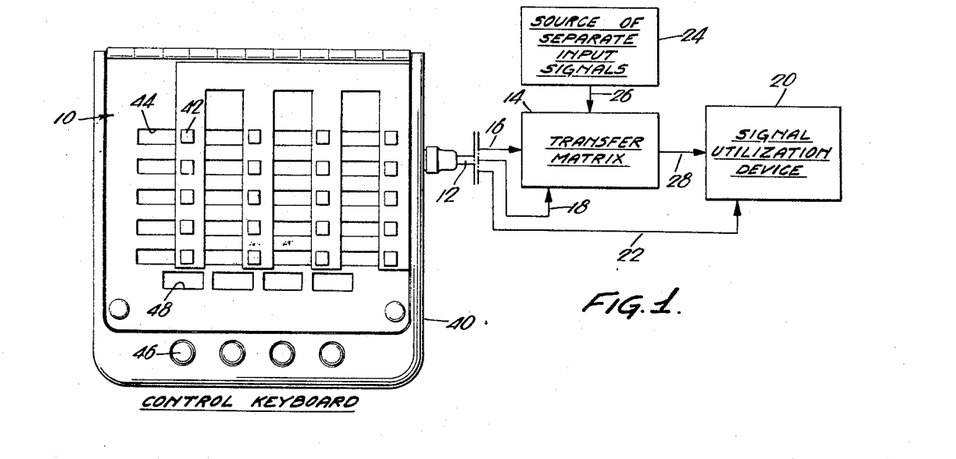
FIGURE 1 is a schematic system diagram partly in block form illustrating one type of system employing the invention.

Referring to FIGURE 1, a control keyboard 10, constructed in accordance with the invention as described in detail hereinafter, is provided with an electrical output cable 12 which supplies two sets of control signals to transfer matrix 14, as by way of electrical lines 16 and 18 respectively, and also supplies control signals to signal utilization device 20 by way of electrical line 22. A source 24 of separate input signals supplies a plurality of intelligence-representing signals to transfer matrix 14 by way of electrical line 26, and transfer matrix 14 is operative to transfer to signal utilization device 20 by way of electrical line 28 a selected one, or selected group, of the input signals as determined by the nature of the control signals supplied to the matrix over lines 16 and 18.

More particularly, the source 24 of separate input signals represents any form of apparatus which supplies to transfer matrix 14 a plurality of separate intelligence-representing signals preferably classifiable into a number of sets according to the types of intelligence represented, or in accordance with some other criterion. In the present example it will be assumed for convenience in explanation that the separate input signals are classifiable into a number of sets M equal to 4, the total number of separate signals equaling a relatively large number K, such as eighty for example. The transfer matrix 14 may then contain a number $K=80$ of controlled transfer elements, each supplied with one of the separate input signals and each having an output connectable to signal utilization device 20 by way of line 28.

By way of example only, the eighty separate input signals may comprise one set representing twenty different data as to product sales, a second set representing twenty different data as to product performance, a third set representing twenty different data as to stock market quotations, and a fourth set representing twenty different data as to air temperatures. The signal utilization device 20 may be a computer which is to operate on these data, or a display system in which the data supplied thereto are displayed at different locations, in different colors, or with different backgrounds such as different optically-superimposed maps, for example.

The function of the keyboard 10 is then to provide a convenient control system by which an operator may select which one or ones of the input signals to the transfer matrix are transferred by the matrix to the signal utilization device and, in a preferred form of the invention, also to provide the signal utilization device with signals to indicate which set of input signals is being transferred thereto so that the signal utilization device may automatically change its characteristics or operation accordingly. For example, the signal utilization device may be controlled so as to display the data on maps, in tabular form, etc. as may be appropriate for the particular type of information. The particular form of signal utilization device employed, and the control arrangements therein for changing its characteristics or operation, are known in the art and, since the details thereof do not constitute part of the present invention, will not be described in detail.

In the form shown in FIGURE 1 the control keyboard comprises generally a supporting frame or case 40 having thereon a plurality, in this case twenty, of momentary-contact control switch buttons or actuating elements such as 42, which in this example are arranged in a pattern of four rows and five columns on the top of the keyboard. Adjacent each of the control switch buttons is an associated transparent region or window such as 44 through which indicia or legends appropriate to the associated control switch buttons are presented to view. Along the front top of the supporting frame 40 are disposed a plurality, in this example four, of selector switch buttons or actuating elements such as 46, and aligned and associated with each of the selector switch buttons is a corresponding transparent region or window such as 48 on the top of the keyboard through which indicia indicative of the function controlled by the corresponding selector switch button are presented to view.

In operating the keyboard in its preferred form, the operator who is interested in presenting to the signal utilization device 20 signals representative of information of a certain class will observe by way of the transparent regions such as 48 which of the selector switch buttons controls presentation of the desired class of data, will depress the selector switch button which has thus been identified, and then, by observing indicia presented to view by way of the transparent regions such as 44, will determine which of the control switch buttons such as 42 he should depress in order to transfer the desired information-representing signal to the signal utilization device 20. The control switches in this example being of the momentary-contact type, the operator will typically depress and release in sequence the control buttons corresponding to all of the signals which he wishes to transfer, one after another, to the signal utilization device.

Now when the operator wishes to present signals of a different class to the signal utilization device, he depresses another appropriate function-selector switch button, as determined by observing the indicia through the windows such as 48, in response to which the set of indicia presented to view through the transparent regions such as 44 are all appropriately changed so that by viewing this new set of indicia the operator may identify the appropriate control switch buttons to be actuated in order to transfer the desired individual information-representing signals to the signal utilization device. In a preferred form of the invention, at the same time a signal is automatically supplied by way of line 22 from the keyboard 10 to the signal utilization device, which signal provides an indication of which selector switch is actuated.

Figure 2:
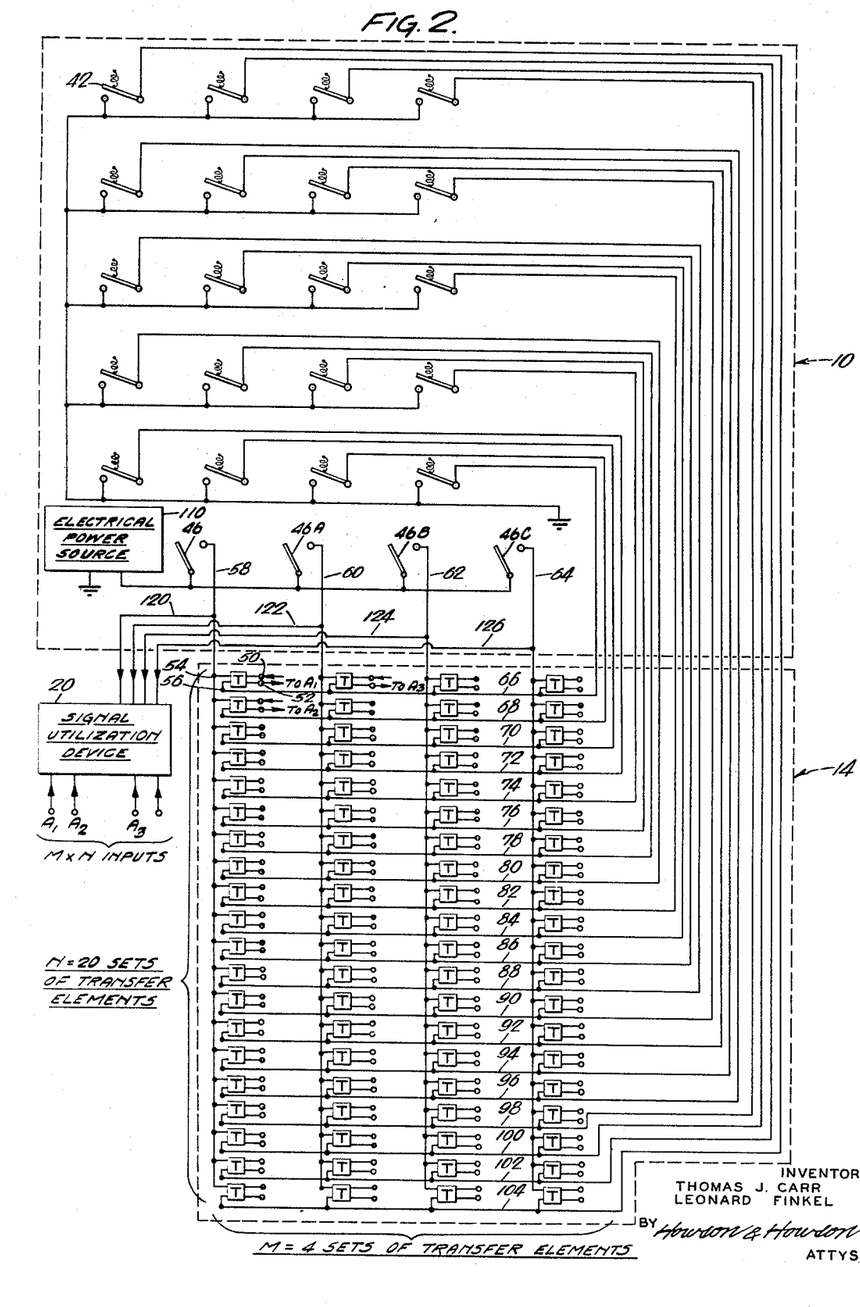
FIGURE 2 is a schematic diagram illustrating the electrical arrangement of one system in accordance with the invention.

Consideration of the electrical schematic diagram of FIGURE 2 will make clearer typical uses to which the system of FIGURE 1 may be put. In this diagram the transfer matrix 14 is represented as comprising four columns and twenty rows of controlled transfer elements each marked T. Each transfer element has a signal input terminal such as 50, each of which signal input terminals may be supplied with a different input signal. Each of the transfer elements also has a signal output terminal such as 52, and each of these output terminals is separately connected to the signal utilization device 20. Ordinarily each transfer element maintains an open circuit between its signal input terminal and its signal output terminal, but each transfer element is provided with a pair of control terminals such as 54 and 56 and any transfer element which is supplied with appropriate control signals at both of its control terminals responds thereto to close the circuit between its signal input terminal and its signal output terminal, thus effecting transfer of its input signal to the signal utilization device 20.

By way of example only, each transfer element might comprise a relay the normally-open pair of controlled contacts of which constitute the signal input and signal output terminals of the element, the opposite ends of the relay control coil comprising the two control terminals such as 54 and 56 which respond to the application of two different potentials thereto to operate the relay and close the output contacts thereof. In another form the transfer elements might constitute magnetic memory elements into which the input signals are "written," application of two appropriate control signals to any magnetic memory element then serving to "read out" the stored signal to the signal utilization device 20. In the present example it will be assumed for convenience that each transfer element constitutes, or at least operates like, a relay.

In the arrangement shown, all of the transfer elements in a given column have one of their control terminals connected to the same electrical lead. For example, one control terminal of all transfer elements in the first column is connected to common lead 58, one control terminal of each transfer element in the second column is connected to common lead 60, one control terminal of each of the transfer elements in the third column is connected to common lead 62, and one control terminal of each of the transfer elements in the fourth column is connected to common lead 64. Further, the other control terminals of all transfer elements located in the same row are connected to the corresponding common lead. These leads for the twenty different rows are identified in FIGURE 2 by the even numbers extending from 66 to 104 inclusive. Accordingly, any one of the transfer elements can be operated selectively by applying appropriate voltages to a particular unique combination of one of the leads 58-64 and one of the leads 66-104.

To provide this selective control function, each of the leads 58-64 is connected to one terminal of a different one of four single-pole single-throw selector switches such as 46, the switch arms of the four selector switches being connected in common to an electrical power source 110 such as a battery which applies to them a potential differing from ground potential. Further, each of the twenty common leads 66-104 is connected to the normally-open switch arm of a different one of the twenty control switches such as 42, the fixed contacts of all of the control switches being connected in common to ground.

Accordingly, closing of any one of the selector switches such as 46 connects one control terminal of each of the transfer elements in a given corresponding column to a source of potential differing from ground potential, while closing of any one of the control switches such as 42 connects the other control terminal of all transfer elements in a particular row to ground potential. That single transfer element which is common to the column supplied with control potential by the selector switch and to the row supplied with control potential by the control switch is therefore selectively supplied with an appropriate difference of potential at its control terminals to operate it and to transfer its input signal to its output terminals and thence to the signal utilization device 20.

In a preferred use of the invention, the four different columns of transfer elements are supplied at their signal input terminals such as 50 with respectively different classes of information-representing signals. For example, the twenty different input signals to the first column of transfer elements may represent the above-mentioned twenty different data as to product sales, the twenty input signals to the transfer elements in the second column may represent twenty different data as to product performance, the twenty different input signals to the third column of transfer elements may represent twenty different data as to stock market quotations, and the twenty different input signals to the fourth column of transfer elements may represent twenty different data as to air temperature. Accordingly, closing of any given one of the selector switches such as 46 selects a particular one of the four sets of transfer elements corresponding to a given class of information data, and operation of a particular one of the momentary-contact control switches such as 42 then determines which datum within that class is transferred to the signal utilization device.

In a preferred form of the invention each of the common leads 58, 60, 62 and 64 associated with the four selector switches is also connected directly to the signal utilization device 20 so that when any one of the selector switches is closed an electrical signal indicative of that closing is supplied over a corresponding one of the leads 120, 122, 124, or 126 to the signal utilization device. As mentioned previously, this signal can be utilized for any of a variety of purposes in the signal utilization device, for example to change the operating characteristics thereof or to accommodate or enhance the handling or display of the signals transferred thereto.

A typical function of the control keyboard 10 of FIGURE 1 in the embodiment presently being described is therefore to provide the types of electrical selection and control functions described with respect to FIGURE 2, and at the same time to present automatically to view by way of the transparent regions such as 44 appropriate indicia for identifying the nature of the datum controlled by each of the control switches such as 42, regardless of which of its four functions a given control switch is performing as determined by which of the selector switches is operated at the time.

Figure 3:
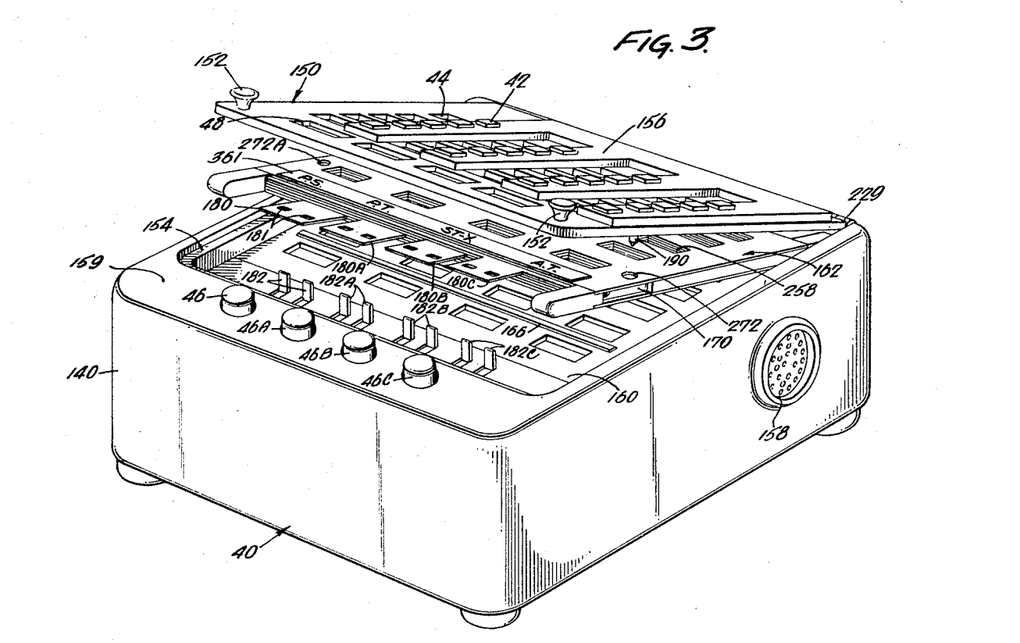
FIGURE 3 is a perspective view of a keyboard in accordance with one embodiment of the invention.

The perspective view of FIGURE 3 shows the general nature of one preferred embodiment of a control keyboard 10 constructed in accordance with the invention. The supporting frame 40 has a fixed base 140 and is provided on its top with a rearwardly-hinged top door 150 which can be opened upwardly by means of appropriate knobs such as 152, or closed against the shoulder 154 in the frame. In this case the five rows of four columns of control switch buttons such as 42 are disposed on top of the door 150 on a digitated wiring conduit 156 which in turn is directly fastened to the top of the door 150. Appropriate wiring for the control switches passes through conduit 156, and near the rear of the keyboard passes downwardly to the interior of base 140 and thence to the output electrical connector 158 mounted on the base. Along the front of the base 140 on a top-deck 159 thereof are the four selector switch buttons 46, 46A, 46B and 46C, each of which when pushed downwardly actuates an electrical switch associated therewith to produce an electrical signal indicative of such actuation, which signal is supplied by appropriate separate wires within the frame 40 to the output connector 158.

In base 140 there is provided a well, the top of which is defined by the top of the shoulder 154 and the bottom of which is defined by the horizontal apertured bottom member 160. This well is provided to accommodate a magazine 162, which can be manually inserted into and removed from the well when the door 150 is open and which in FIGURE 3 is shown in a position which it might occupy during the process of its manual insertion or removal, it being understood that in use the magazine lies flat against a pair of laterally-extending support strips such as 166 on the top of the bottom member 160.

The magazine 162 is filled with a stack of individually slidable plate members normally equal in number to the number of selector switches, in this case four. Except when the magazine is in the frame and the door closed, the individual plate members are positively held retracted in said magazine in a mutually aligned position by means of a pair of spring arrangements such as 170, one on each of the opposite side edges of the magazine 162. Each of the individual plate members is provided with sets of transparent regions, which in this example are apertures, as are the top and bottom surfaces of the magazine 162, arranged in the same pattern as the transparent regions in the top door. With all of the plate members in the retracted position shown in FIGURE 3, the set of transparent regions in the door 150, the set of transparent regions in the top and bottom surfaces of the magazine 162, and the apertures in the bottom member 160 are all aligned with each other and, as will be shown more clearly hereinafter, are also in alignment with corresponding sets of transparent regions in each of the plate members in the magazine 162.

Each of the plate members in the magazine is provided with a different set of indicia thereon, arranged so that when the magazine is inserted, the door closed, and no selector switch actuated, these indicia will be invisible from the top of the keyboard because they will be located behind opaque regions in the top door 150. However, the slidable plate members are provided with separate forwardly-projecting tabs 180, 180A, 180B and 180C having therein respective pairs of small apertures 181, 181A, 181B and 181C. The selector switches 46, 46A, 46B and 46C are mechanically linked with respective pairs of upwardly-projecting prongs 182, 182A, 182B, 182C positioned so that, with the magazine 162 in place and the door 150 closed, the pairs of prongs 182, 182A, 182B and 182C pass through the pairs of apertures 181, 181A, 181B and 181C, respectively, in the plate tabs.

The undersurface of the door 150 is provided with downwardly-projecting spring-releasing prongs such as 190, which act on the plate-retaining spring arrangements such as 170 to release the individual plate members when the door is closed. The mechanism associated with the selector switches is then such that when any given selector switch is depressed the pair of prongs associated with it is urged forwardly to pull forward a corresponding one of the plate members by a distance sufficient to expose its set of indicia to view through the top of the door 150. The mechanism is also constructed so that when another selector switch is depressed the plate which was previously pulled forward is returned to its original retracted position and the plate corresponding to the newly-actuated selector switch is instead pulled forward to expose its indicia to view from the top. Indicia on the plates are of course appropriate to identify the functions which the control switches perform when the particular selector switch is in its actuated position. By depressing any one of the selector switches only partly through its downward stroke, all plates will be returned to their retracted positions thus clearing the keyboard so that the door may be opened and the magazine containing the then positively-retained plate members removed, and another inserted.

The details of the construction and operation of the preferred embodiment of the keyboard shown in FIGURE 3, as well as further features of construction and operation not readily ascertainable from consideration of FIGURE 3, will be apparent from the following description of the more detailed views now to be described.

Figures 4, 5, 6, 7:
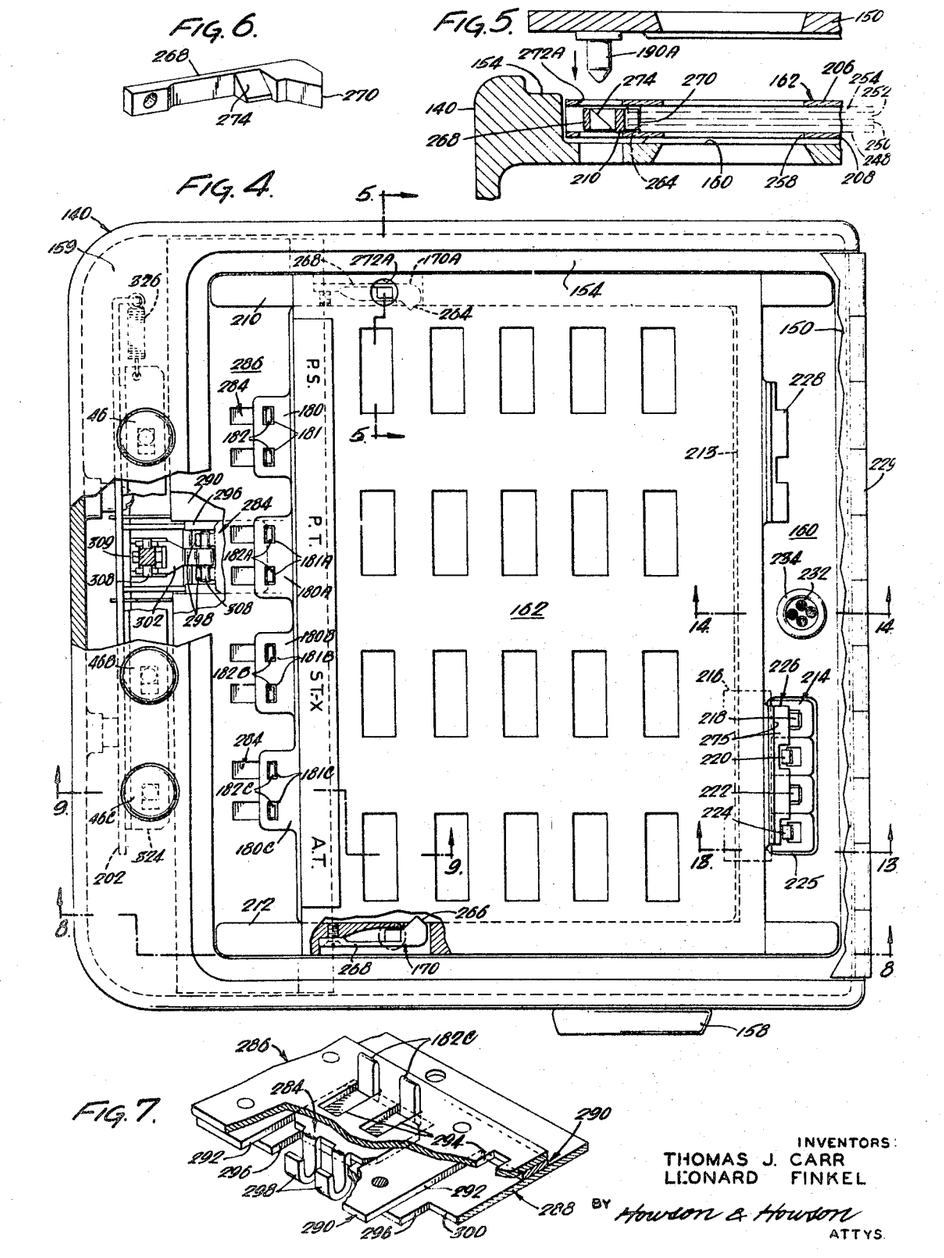
FIGURE 4 is a top view of a keyboard in accordance with the invention, with certain parts broken away.
FIGURE 5 is an elevational section of a fragment of the structure of FIGURE 4 taken along the line 5—5.
FIGURE 6 is a perspective view of one element of FIGURE 5.
FIGURE 7 is a perspective view of a slider arrangement used in the embodiment illustrated in FIGURE 4.
Figure 8:
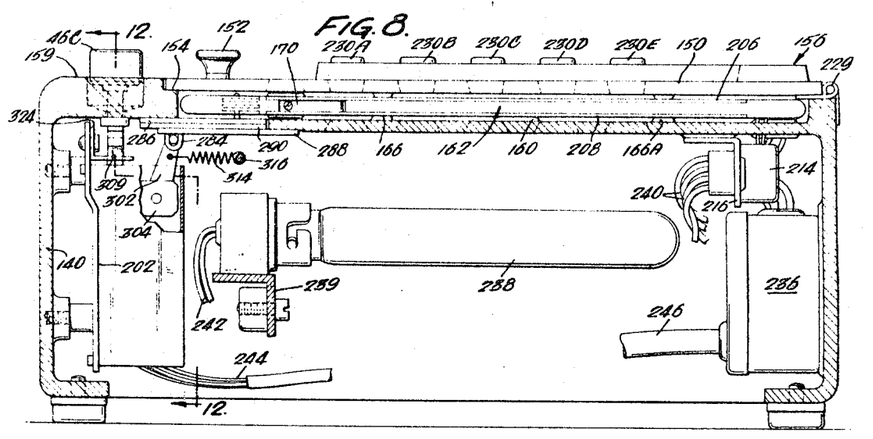
FIGURE 8 is a sectional view of the apparatus of FIGURE 4 taken along line 8—8.
Figures 9, 10, 10A, 11:
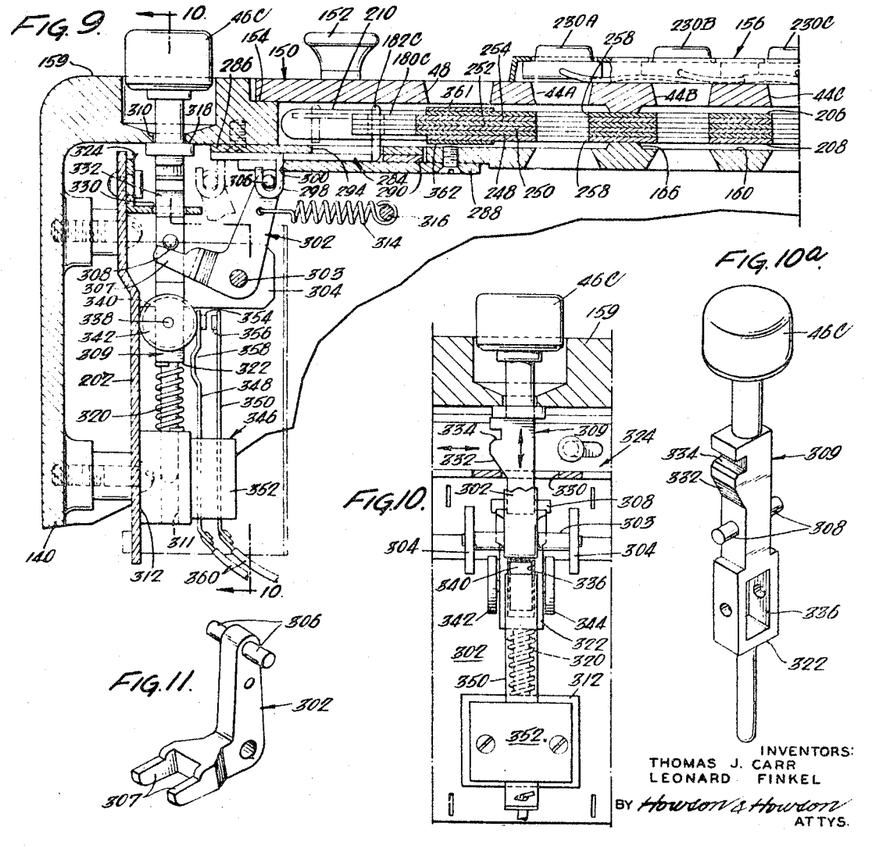
FIGURE 9 is an enlarged sectional view of a fragment of FIGURE 8.
FIGURE 10 is a rear view of a portion of the mechanism of FIGURE 9 taken along the lines 10—10.
FIGURE 10A is a perspective view of a portion of the mechanism shown in FIGURE 10.
FIGURE 11 is a perspective view of a portion of the mechanism shown in FIGURE 9.

Referring now particularly to FIGURES 4, 8 and 9, the magazine 162 is shown in place on the transverse support strips 166 and 166A secured to the upper surface of the bottom member 160, which is in the form of a plate formed integrally with the four side walls and top deck of the base 140, as by means of a common casting. As shown, the bottom plate terminates short of the forward wall of the base 140. Under the front part of the top deck 159 of the base 140 a supporting plate 202 is mounted from the front vertical wall of the base, and the selector switch mechanism is mounted from this supporting plate. The shoulder 154 on which the top door rests when closed extends around all four sides of the opening in the top of the supporting frame and defines the top of a rectangular well into which the magazine 162 fits.

The magazine 162 comprises an upper apertured plate 206, a lower apertured plate 208, a pair of longitudinal spacer bars 210 and 212 which are affixed between, and along opposite side edges of, the upper and lower apertured plates, and a transverse spacer bar 213 extending along and between the rear edges of the plates 206 and 208 and fastened at its opposite ends to the longitudinal spacer bars toward the rear thereof. The longitudinal spacer bars are of longer dimension than the depth of the upper and lower apertured plates 206 and 208 and are positioned and dimensioned so as to fit and be held snugly in fixed position by the walls of the well provided therefor in base 140. Once in position on the bottom member 160, the magazine is therefore held in fixed position until pulled upwardly out of the well by the operator.

Figure 13:
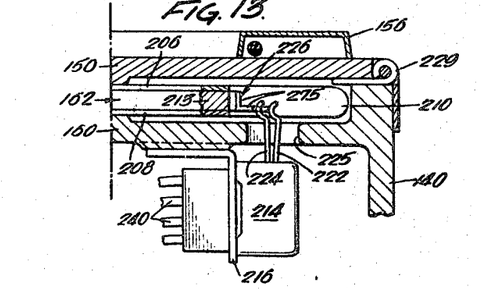
FIGURES 13 and 14 are enlarged fragmentary sectional views of different parts of FIGURE 4, taken along the lines 13—13 and 14—14 respectively.

A code-reading device 214 is mounted on a bracket 216 on the undersurface of bottom member 160 and has four switch actuating arms 218, 220, 222 and 224 which extend upwardly through an opening 225 in bottom member 160 past the rearward edge of the magazine in a position to be contacted by elements of a coding structure 226 mounted on the rear of the magazine, as shown for example in FIGURE 13. Another coding structure 228 on the rear of the magazine 162 is located so that if the magazine 162 is turned over to interchange the positions of bars 210 and 212, the coding member 228 will be properly located to cooperate with the code-reading device 214.

Figure 14:
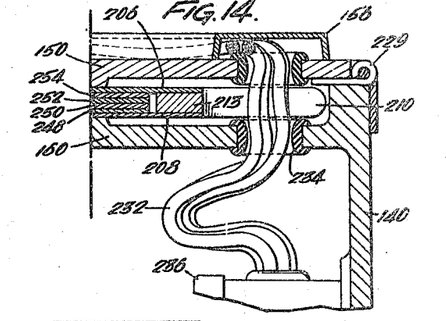

The top door 150 is pivotably mounted to the back of the base 140 by hinge 229. The twenty control switch buttons such as 230A, 230B, 230C, 230D and 230E and their corresponding switch elements are mounted on conduit 156 in the above-described five rows and four columns and, as shown in detail in FIGURE 14, the wiring 232 for the control switches passes downwardly through an opening 234 in bottom member 160 near the rear of the base 140 and into a junction box 236 mounted on the rear wall of the base. Sufficient slack in the wiring is provided to accommodate the opening movement of the top door 150, although alternatively a flexible printed wiring strip may be inserted in the wiring at this point. FIGURE 9 shows especially clearly the transparent regions such as 44A, 44B and 44C in the door 150, each transparent region in this example comprising a rectangular aperture located immediately adjacent one of the control switch buttons.

As shown in FIGURE 8, one or more light sources such as incandescent bulb 238 are mounted by means of transversely-extending bracket 239 beneath the bottom member 160 to provide rear illumination thereof. Wiring 240 from code-reading device 214, wiring 242 for supplying current to the light source 238, wiring 244 for the selector switch assembly, and wiring 246 containing the control button wiring, are all connected to the output electrical connector 158 on base 140.

Figures 15, 16, 17, 22, 23:
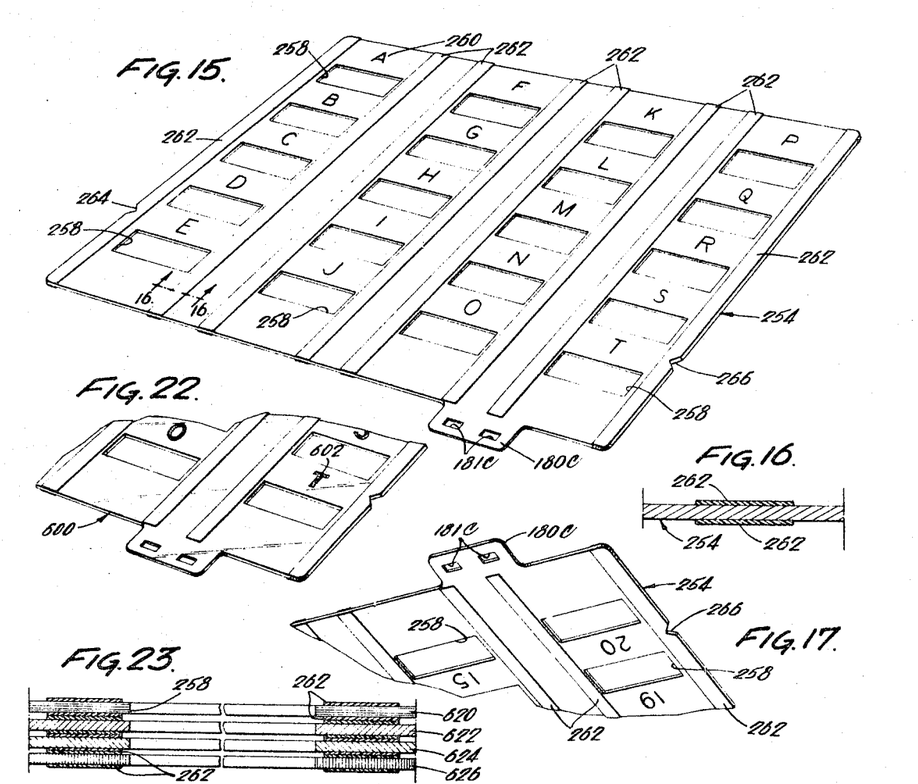
FIGURE 15 is a perspective view showing the top of a plate member suitable for use in the keyboard of FIGURE 4.
FIGURE 16 is a fragmentary enlarged sectional view taken along the lines 16—16 of FIGURE 15.
FIGURE 17 is a fragmentary perspective view showing the bottom of the plate member of FIGURE 15.
FIGURE 22 is a fragmentary perspective view illustrating a modified form of the plate member of FIGURE 15.
FIGURE 23 is a sectional fragmentary view illustrating still another construction of plate members for use in the keyboard of the invention.

Considering now in more detail the magazine 162 and its contents, the magazine in this example contains four slidable plate members 248, 250, 252 and 254 stacked above each other with their major surfaces parallel to the top and bottom major surfaces of the magazine. A typical plate member 254 is shown in FIGURE 15, and is seen to comprise the four columns and five rows of rectangular apertures such as 258 arranged to be alignable with the corresponding set of apertures in the door 150. Legible indicia such as 260 are located immediately rearward of each of the apertures in plate 254, each plate member typically having a different set of indicia thereon. As shown in FIGURES 15 and 16, a plurality of slide strips such as 262 are disposed from front to back on the upper and lower surfaces of each plate member, and may be of Teflon or some similar low-friction durable material to render the plate members easily slidable longitudinally with respect to each other, and with respect to the upper and lower plates of the magazine. These strips may be bonded to the plate member by a suitable adhesive.

A pair of notches 264 and 266 are provided on opposite transverse edges of each slide plate member as shown in FIGURE 15, which cooperate with the plate-retaining spring arrangements such as 170 and 170A to retain the plate members positively in mutually-aligned positions when the door 150 is open. More particularly, as shown in detail in FIGURES 5 and 6, the spacer bar 210 is provided with a recess containing a spring member 268 secured thereto at one end so that a wedge-shaped portion 270 at its opposite end is urged inwardly toward the region of the magazine containing the indicia-bearing plate members. The wedge-shaped portion 270 is of such shape and height as to snap into the wedge-shaped notches, such as 264 of FIGURE 15, in one side of all of the plate members when the plate members are aligned with each other and in their retracted position in the magazine. In the latter condition the magazine can be removed and handled without danger of the plate members sliding out of the magazine, and while the magazine is being placed in position in the keyboard the plate members are held in a fixed predetermined position therein. The spring arrangement 170 on the opposite edge of the magazine is constructed and operates in the same manner as spring arrangement 170A.

Further, the upper and lower apertured plates 206 and 208 of the magazine are both provided with cylindrical apertures such as 272 and 272A extending through spacer bars 212 and 210 respectively, each aperture being aligned with one of the downwardly projecting prongs 190 and 190A on the under surface of the door 150, as shown in FIGURE 5 for prong 190A. Each spring member such as 268 is provided with a bevelled protrusion 274 which, when the wedge-shaped tip 270 is in engagement with the plate members, extends at least partially across the cylindrical aperture 272A in the magazine. The arrangement is such that when the top door 150 is closed, the prong 190A moves downwardly in the cylindrical aperture 272A, the prong 190A preferably having a conical lower tip the side surfaces of which engage the slanted surface of the bevelled protrusion 274 to force the spring member 268 to retract into the spacer bar 210 and out of the notches in the plate members, thus freeing the plate members to permit them to move slidably with respect to each other. When the door 150 is opened and the plate members returned to their retracted position, the spring member 268 again snaps into the notches on the plates and holds them in position. Again, the same construction and operation is provided in connection with the spring arrangement 170 on the oppoiste edge of the magazine, which cooperates with a corresponding set of notches in the plate members.

The coding structure 226 on the rear of the magazine may comprise a strip of metal bent at right angles in the shape of an angle iron, one of its two mutually perpendicular flanged surfaces being secured to the vertical back surface of the transverse spacer bar 213 and the other flanged portion 275 extending rearwardly toward the upwardly-extending four microswitch arms 218, 220, 222 and 224. The rearwardly-extending flange 275 is coded in the sense that certain portions thereof extend rearwardly sufficiently to operate a particular one or group of the microswitch arms, while other portions thereof do not extend sufficiently rearwardly to actuate any of the switch arms. Conveniently the coding structure 226 may be made by first making the rearwardly extending flange 275 sufficiently large to actuate all of the switch arms, and then punching away portions of the flange 275 opposite those switch arms which are not to be actuated by the coding structure. The coding structures on different magazines for use in the keyboard will be differently coded, so as to actuate different combinations of the four switches, and the four separate switches actuated by the four switch arms are connected in appropriate electrical circuits to produce electrical indications of which combination of switch arms has been actuated; for example a battery and a separate pair of wires to each of the four switches will produce a current only through any pair of wires connected to a switch which is closed. In the arrangement shown in FIGURE 4 another coding structure 228 similarly provided on the rear of the magazine is coded differently from coding structure 226, but arranged to cooperate with the same code-reading device 214 when the magazine is turned over to reverse the positions of the two side bars 210 and 212 in the keyboard base. Accordingly the code-reading device 214 provides a four-digit binary electrical output indicative of which magazine is in the keyboard, and of which way it is turned therein.

FIGURE 4 shows the four forwardly-projecting tabs 180, 180A, 180B and 180C which are integral with plate members 248, 250, 252 and 254 respectively. These tabs contain, respectively, the pairs of rectangular apertures 181, 181A, 181B and 181C. The pairs of holes in the tabs are situated symmetrically on either side of a front-to-back center line of the magazine so that when the magazine is turned over the pair of holes in each tab will then occupy positions substantially identical with the corresponding positions formerly occupied by a pair of apertures in one of the tabs.

The pulling forward of a selected indicia-bearing plate member to render its indicia visible through the masking structure provided by the apertured door is then accomplished by the following arrangement, which also serves to return non-selected plate members to their cleared position. In this example the four mechanisms for moving each of the four plate members forwardly and backwardly selectively in response to depression of a corresponding associated selector switch button are all identical with each other. Considering one of these mechanisms by way of example, the pair of upwardly-projecting prongs 182C is an integral part of a captive slider 284 constructed and arranged as shown in particular detail in FIGURES 7 and 9. The slider 284 is held in an assembly of three transversely-extending metal strips, the same strips being used for all four sliders. The top strip 286 is secured by appropriate screws to the underside of the top deck 159 of base 140 adjacent the front of the door opening, and the bottom strip 288 is secured by screws to the underside bottom plate 160. The middle strip 290 is secured to the top and bottom strips and provided with four slots such as 292, one for each slider, the horizontal sliding portion of each slider being held in the slot between the top and bottom strips so that the edges of the slot serve as guideways for the slider. The top strip 286 is provided with a pair of smaller slots such as 294 to accommodate upward extension and forward-and-backward motion of the prongs 182C. The bottom strip 288 has a cut-away portion 296 to accommodate a pair of downwardly-extending hook-shaped members, 298, the cut-away being of sufficient depth to provide an appropriately-placed stop surface 300 on bottom strip 288 against which the hoop-shaped members strike to positively limit the rearward motion of the slider. It is the backward and forward sliding motion of slider 284 which provides the required backward and forward sliding of the corresponding plate member 254, and a similar action is utilized in connection with each of the other three plate members.

As shown particularly clearly in FIGURES 9 and 11, the forward and backward motion of the slider 284 is produced by pivoting of arm member 302 about an axis provided by a transverse rod 303 which may be secured to two parallel plates such as 304 mounted normally on support plate 202. As shown in FIGURE 11, arm member 302 is provided with a pair of oppositely-extending stubs 306 pivotably positioned in the trough formed by the hook-shaped members 298, while the other end of arm member 302 is modified to provide a pair of spaced, opposed yoke arms 307 positioned to be engaged by a pair of oppositely-extending stubs 308 on the specially-formed selector-switch plunger 309.' Plunger 309 has selector switch button 46C affixed to the top thereof and is guided for vertical reciprocatory motion near its top by the closely-fitted encircling opening 310 in deck 159 and at its bottom end by a cylindrical, vertical, closely-fitting opening 311 in a block 312 mounted on supporting plate 202.

Accordingly when the selector switch button 46C is pressed downwardly, the stubs 308 on plunger 309 urge yoke arms 307 downwardly, causing arm member 302 to pivot counter-clockwise and thereby acting on hook-shaped members 298 to move slider 284 forwardly from the full-line position to the broken-line position shown in FIGURE 9, thus also moving the top plate member 254 from its full line, retracted position to its broken-line forward position in which the indicia thereon formerly hidden behind opaque portions of the door 150 are now visible through the apertures in the door. A spring 314, connected between the portion of the arm member 302 adjacent the hook-shaped members 298 and a transversely-extending rod 316 fastened to opposite side walls of base 140, opposes this counter-clockwise motion and, when plunger 309 is raised, causes the arm member 302 to rotate clockwise and move the slider 284 back to its retracted position against stop surface 300. The same mechanism and operation is provided in connection with each of the selector switch buttons.

Plunger 309 and button 46C are urged upwardly toward their normal, non-actuated position, as defined by a shoulder 318 on plunger 309, by means of a helical compression spring 320 disposed around the lower end of plunger 309 and retained between the top of block 312 and another shoulder 322 on plunger 309.

Figure 12:
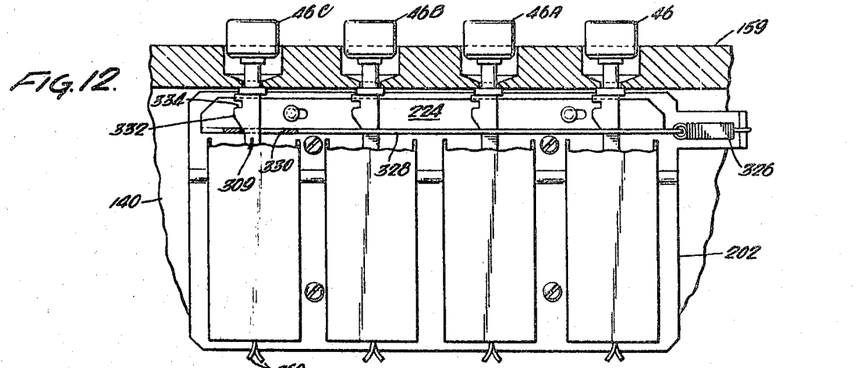
FIGURE 12 is a rear view of a portion of the mechanism of FIGURE 8 taken along the lines 12—12.

In order to hold plunger 309 in its downward position and slider 284 in its forward position until another selector switch button is operated and then to release it, a latch and interlock arrangement is provided as follows. A transversely slidable interlock bar 324 is mounted for slidable transverse motion on supporting plate 202 by means of appropriate rivets and slotted holes. The interlock bar is spring-biased to the left as viewed from the front of the keyboard, by means of a spring 326 connected between the bar and the supporting plate 202, as shown in FIGURES 4 and 12. The interlock bar has a horizontally-extending flange 328 having four rectangular apertures such as 330 therein, each aperture surrounding a different one of the selector switch plungers such as 309 in the region thereof just above the pair of stubs such as 308. Just above the portion of plunger 309 surrounded by the flange 328 in the normal, non-actuated position of the plunger is an upwardly-slanted protruding bevel 332, and slightly above the bevel is a detent 334 of a size to accommodate and receive the thickness of the flange 328 on the interlock bar 324.

The arrangement is such that when the selector switch button 46C is depressed, the interlock bar 324 is moved by the bevel 332 to the left as viewed in FIGURES 10 and 12, by an amount sufficient to free the interlock bar from any detent in which it may be located due to previous operation of a selector switch button, thus permitting the plunger and slider corresponding to the previously-operated selector button to be spring-returned to their normal non-actuated positions. Further depression of the actuated selector button causes the detent 334 thereon to become aligned with the flange 328 on the interlock bar, and the flange falls into the detent thus latching the actuated plunger in its downward position until such time as it is released by later depressing of another selector switch button.

By depressing any one of the selector switch buttons sufficiently to release the interlock bar from any previously-depressed plunger, but not so far as to latch the interlock bar with the newly-depressed plunger, the keyboard can be cleared so that all sliders and their corresponding plate members are returned to the retracted position within the magazine and the keyboard thereby cleared. The stop position for the sliders in their retracted position is such that the plate members are returned to an aligned position for which the notches in the sides of the the plate members are aligned with the above-described wedge-shaped tips on the retaining spring members such as 268 at the edges of the magazine, so that when the keyboard door 150 is raised these spring members will snap into the notches in the plate members and hold the plate members affirmatively aligned in the magazine.

As is shown particularly clearly in FIGURES 9, 10 and 10A, each actuating plunger such as 309 has a set of wheels thereon, in this example three such wheels, mounted to roll along the interior surface of the supporting plate 202. In this example the region between the stubs 308 and the lower tip of the plunger 309 is provided with a central opening such as 336 in which there is mounted a transverse axle 338 on which the three wheels 340, 342 and 344 are mounted, wheel 340 being mounted within the opening 336 in plunger 309. The other two wheels are mounted on the axle outside opposite exterior surfaces of the plunger 309. The three wheels turn in parallel planes, and one of the wheels 340 is used as a cam for operating an electrical switch 346. For this purpose wheel 340 is preferably of a hard durable material such as Teflon for example.

As is shown clearly in FIGURE 9, the switch 346 may comprise a pair of flexible switch arms 348 and 350 mounted on, and extending upwardly from, an insulating block 352 on the rear of the plunger-centering block 312. In the embodiment shown, switch contacts 354 and 356 provided on switch arms 348 and 350 respectively are normally open when the selector switch plunger 309 is in its normal, upward position. However, when a selector switch button such as 46C is depressed by a distance sufficient to latch the plunger 309 in its downward position, the wheel 340 has moved downwardly sufficiently to bear against a cam surface 358 on switch arm 348 and to urge contact 354 into connection with contact 356, thus closing switch 346. When the plunger 309 is released from its latch and rises again to its non-actuated position, the wheen 340 is removed from cam surface 358 and the switch contacts spring apart to open the switch. Accordingly, whenever one of the selector switch buttons is pushed down to latch its associated plunger in the downward position, a corresponding pair of electrical contacts is closed, thus completing the circuit through a pair of wires such as 360 and thereby making possible remote electrical indication of the actuated or non-actuated state of the corresponding selector button. One of the wires 360 may be connected to the electrical power source 110 of FIGURE 2 and the other wire to common lead 64 of FIGURE 2, the corresponding pairs of wires for the three other selector switches being similarly connected to the other common leads 62, 60 and 58 as shown in FIGURE 2.

As can be seen most clearly in FIGURE 3, the top of the magazine 162 is preferably provided near its front edge with a transversely-disposed strip 361 bearing four sets of indicia each aligned with a different one of the transparent regions such as 48 in the door 150. A similar indicia-bearing strip is preferably provided on the opposite, lower surface of the magazine as at 362 in FIGURE 9. In general, the indicia located on these indicia-bearing strips will be different for different magazines and for the upper and lower surfaces of the same magazine. Each set of indicia is such that, when the magazine is placed in the keyboard, the indicia presented through the openings such as 48 indicate the function which is then selectable by the selector switch longitudinally-aligned therewith.

Considering now the operation of the keyboard just described in detail, the magazine is first prepared by inserting therein a plurality of slidable plate members each bearing a set of indicia, each such set being appropriate for presentation adjacent the control switch buttons such as 42, and each plate member having its forwardly-extending tab such as 180 differently positioned transversely of the magazine so as to be engaged by an appropriate different pair of prongs such as 182, and so as to be pulled forwardly in response to actuation of the proper corresponding selector switch button when placed in the keyboard. The door 150 of the keyboard is opened and the magazine is slid into a horizontal position on the bottom plate 160 so that the coding structure 226 on the rear of the magazine is aligned with, and engages, the code-reading device 214 near the rear of the base 140. At this point the plate members are retained in their mutually aligned, retracted position in the magazine by the spring arrangements 170, 170A, while the upwardly-extending prongs such as 182 pass through the apertures such as 181 in the forwardly-protruding tabs on the plate members. The top door 150 is then closed, the prongs 190, 190A in the top door then releasing the plate members from the spring arrangements 170, 170A so as to make the plate members readily slidable forwardly and backwardly in the magazine. At this point the transparent regions, or apertures, in the door 150, in the upper and lower plates of the magazine, and in the plate members themselves, are all aligned with each other so that no indicia are presented to view from the top of the keyboard. Now depression of any one of the selector switch buttons such as 46 sufficiently far downwardly automatically causes a corresponding one of the plate members to be pulled forwardly to its visible position, in which position it is latched by the above-described latching and interlock arrangement. At the same time the contacts of the electrical switch associated with the actuated selector switch button are automatically closed to provide an output electrical signal from the keyboard indicative of the actuation of that particular selector switch. This same signal from the selector switch is preferably supplied as a control signal to the matrix of controlled transfer elements as one of the transfer element control signals described above. The operator then depresses the momentary-contact control switch buttons on top of the switchboard in sequence to produce the other control signal for selecting a particular transfer element for actuation, thereby to transfer to the signal utilization device 20 that input signal identified by the indicia adjacent the operated control switch.

If the operator is next interested in information contained in input signals controlled by a different set of transfer elements, he then depresses that selector switch button aligned with those indicia presented through the transparent regions such as 48 corresponding to the class of input signals in which he is then interested. By means of the above-described interlock, this causes the latch on the previously-actuated selector mechanism to release its corresponding slider and permit the corresponding plate member to be spring-returned to its retracted or cleared position. In addition, further depression of the now-actuated selector switch button causes the corresponding plate member to be pulled forward into its visible position, in this way changing the set of indicia visible adjacent the control switches. At the same time an electric signal is produced by the actuation of the electric switch associated with the now-operated selector switch button, thereby to provide a control signal to another set of the transfer elements, any one of which set of elements is then actuated by the above-described sequential operation of one of the control switch buttons. As described previously, the electrical signal provided by the selector switch electrical contact device is preferably also supplied to the signal utilization device 20.

When the operator has finished performing control operations possible with this particular magazine in its particular position in the keyboard, any one of the selector switches may be depressed part way, i.e. sufficiently to permit clearing of the keyboard by returning all slide members automatically to their cleared positions, and insufficiently to pull any one of the slide members forward into its visible position. The door may then be opened, thus releasing the retaining spring arrangement 170, 170A to hold the plate members affirmatively in their mutually-aligned positions, and the magazine removed from the keyboard.

The removed magazine may then be replaced by an entirely different magazine containing plate members having different sets of indicia from those in the original magazine, or the magazine may be turned over in the keyboard in the event that, as illustrated in FIGURE 17, directly-opposite sides of each plate member such as 254 are provided with two different sets of indicia; for example, in FIGURE 15, the indicia visible on the top side of plate member 254 are all letters, while the lower, or opposite side, of the same plate member 254 carries a different set of indicia, in this case all numerals. When the same magazine is used in its reversed position in the keyboard, or another magazine is inserted, actuation of the selector switch buttons will render visible different sets of indicia than were provided by the original magazine in its original position. The operator is able to identify which functions the selector switches are producing by observing the different indicia on the indicia-bearing strips such as 361 which are presented to view through the transparent regions such as 48 in alignment with the selector switch buttons.

Thus the selector switch buttons and the control switch buttons may be utilized to control an entirely different group of transfer elements for each magazine and for each of the two reversible positions of each magazine. In order to do this automatically, the keyboard derives, and supplies to its output conenctor, appropriate magazine identifying electrical signals. These signals are provided by the coding structures such as 226 and 228 in FIGURE 4, in cooperation with the code-reading device 214 as described previously. Typically each magazine will contain two such coding structures which differ in the code they present, the coding structures on the various magazines all differing from each other. For example, in the arrangement shown in FIGURE 4 the magazine coding structure 226 will operate the switch arms 218 and 222 of the code-reading device 214, while coding structure 228 and all of the coding structures on all other magazines will operate a different combination of switch arms of the code-reading device. The closed or open conditions of the four switches operated by the four switch arms on the code-reading device 214 constitute a binary digital indication of which magazine is in the keyboard, and of in which of its two reversible positions it is.

Figure 18:
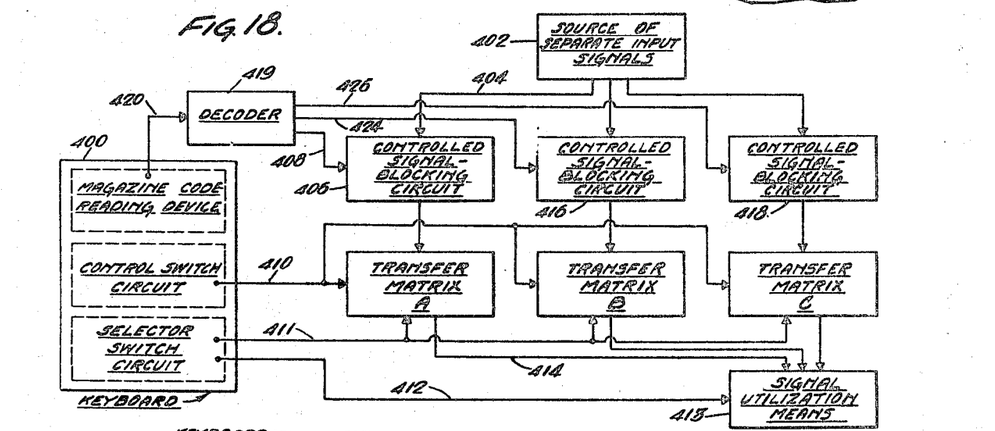
FIGURE 18 is a block diagram illustrating a system employing a control keyboard in accordance with the invention in one of its aspects.

FIGURE 18 indicates one arrangement by which the magazine-identifying signals may be utilized to increase the number of transfer elements controlled by the keyboard. In this arrangement the keyboard 400 may be like that described in detail hereinbefore, and the transfer matrix A may be identical with the transfer matrix 14 in FIGURES 1 and 2. The source of separate input signals 402 in this case supplies output line 404 thereof with all of the eightly input signals described in connection with FIGURES 1 and 2, this set of signals being supplied to the transfer matrix A in the arrangement as illustrated in FIGURE 2, but in this case by way of a controlled signal-blocking circuit 406 which can be controlled by a control signal applied to input control lead 408 thereof to pass none, or to pass all, of the input signals thereto to the transfer matrix A. Transfer matrix A is also supplied with control signals from the control switch circuit of the keyboard by way of line 410, and with further control signals from the selector switch circuit of the keyboard by way of line 411, so that when signal-blocking circuit 406 is transmissive to permit passage of all input signals therethrough, the keyboard and transfer matrix A operate in the same manner described hereinbefore selectively to transfer input signals to the signal utilization device 413 by way of line 414. Line 412 corresponds to line 22 in FIGURE 1.

However, in the FIGURE 18 system the transfer matrix B and the transfer matrix C, each of which may be identical in internal construction with transfer matrix A, are connected directly in parallel with transfer matrix A with respect to control lines 410 and 411 and with respect to signal utilization device 413. Any one of the three transfer matrices A, B and C is therefore capable of operation in the manner described hereinbefore provided that it is supplied with input signals.

Thus the source of separate input signals 402 supplies signal blocking circuits 416 and 418 with sets of input signals differing from each other and from those supplied to signal-blocking circuit 406. Typically circuits 416 and 418 may each be supplied with eighty input signals when used with the matrix A arrangement shown in FIGURE 2. Which of the transfer matrices A, B or C is rendered effective to be controlled by the keyboard in selectively transferring signals to the signal utilization device 413 is therefore determined by which of the blocking circuits 406, 416 and 418 is rendered transmissive of input signals at a given time.

To control the operation of the blocking circuits, the magazine code-reading device in keyboard 400 supplies the above-described binary digital coded electrical signal to a decoder 419 by way of line 420. Depending on which code is supplied to it, the decoder 419 renders transmissive a particular one of the blocking circuits 406, 416 or 418 by means of signals supplied thereto by way of lines 408, 424 and 426 respectively.

It will be understood that as many transfer matrices as there are different types of codes on the magazines may be added to the aggregate of transfer elements which may be controlled by the keyboard, by providing a corresponding number of blocking circuits and control connections as described above. The arrangement by which the binary coded signals from the code-reading device are utilized to provide an additional dimension of control for the transfer elements may be quite different from that shown in FIGURE 18. For example, each transfer element may have three control terminals all of which must be simultaneously supplied with an appropriate control signal before any given transfer element is actuated, and the control signals on lines 410, 411 and 420 from the keyboard may be separately supplied to different ones of these three control terminals to operate any one of the transfer elements in response to a predetermined combination of a given magazine-identifying signal from the code-reader, with actuation of a given selector switch and control switch.

Figure 19:
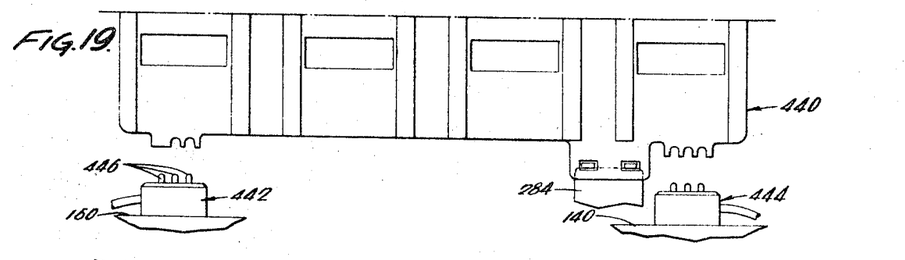
FIGURE 19 is a fragmentary top view of an alternative form of plate member and of code-reading means which may be used in the keyboard of FIGURE 3.
Figure 20:
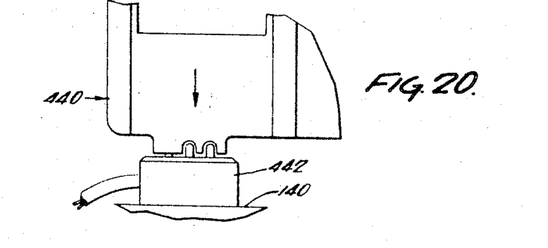
FIGURE 20 is a fragmentary view of a portion of the apparatus of FIGURE 19 with the plate member moved into contact with the code-reading device.

FIGURES 19 and 20 illustrate a modified form of the invention in which each of the plate members in each of the magazines is provided with a different code. For example, the leading edge of each plate member such as 440, which is otherwise like plate member 254 in FIGURE 15, is modified in the region of its front corners to provide a binary digital coding structure of switch actuating elements which cooperate with two microswitch-type code-reading devices 442 and 444 mounted on the keyboard at the front of the magazine-receiving well therein. Each code-reading device in this example has three switch-arm elements such as 446 which have the form of a knife edge extending sufficiently in the vertical dimension to be operable by the coding structure on any one of the plates which is pulled forward to its visible position. Thus when a plate member such as 440 is in its retracted or cleared position as shown in FIGURE 19, none of the switch-arm elements of the code-reading devices 442 and 444 can be actuated; however, as illustrated in FIGURE 20, when a selector switch is actuated to pull a particular plate member into its visible position, the coding structure on the front edge of that plate member actuates a particular combination of the switch-arm elements of the two coding devices, as determined by the nature of the code on the front of the plate member. Different coding arrangements are utilized on each of the plate members in a given magazine and in all magazines to be utilized in the keyboard, one code being applied to one only of the plate members. Each of the six code-reading switches is provided with appropriate electrical circuitry, for example one circuit for each code-reading switch so that current flows in different combinations of the six circuits depending on the code on the plate members.

Figure 21:
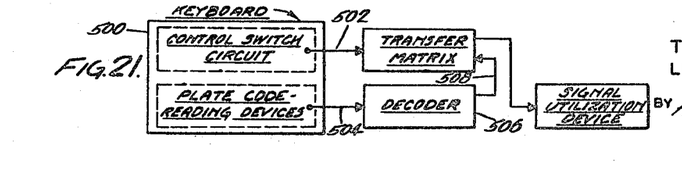
FIGURE 21 is a block diagram illustrating another form of keyboard-controlled system in accordance with the invention in one aspect.

As illustrated in FIGURE 21, in such a system using coding on the individual plate members the keyboard 500 no longer requires the above-described electrical switch contacts on the selector switches or the coding structure on the individual magazines, but may otherwise be substantially identical to that described in detail hereinbefore. For example the control switches of the keyboard 500 may provide control signals by way of control line 502 to a transfer matrix of transfer elements, and the plate member code-reading devices may supply a binary plate-identifying signal by way of control line 504 to a decoder 506, which in turn supplies control signals to the transfer matrix by way of line 508. The control signal provided by way of line 508 is then no longer limited to selecting a number of of sets in the matrix equal to the number of selector switches, but instead can control the selection of any one of a number of sets of interconnected transfer elements equal to the number of possible coding combinations available on the leading edges of the plate, which may be a large number. Accordingly each code on each plate member selects a particular set of transfer elements for actuation, and the control signal from the control switch circuit determines which transfer element in that set is actuated in a manner similar to that described with reference to FIGURE 2.

FIGURES 22 and 23 illustrate one of several possible modifications of the nature of the plate members utilized. In the case shown in FIGURE 22 the plate member 600 differs from plate member 254 of FIGURE 15 in that it is made of a clear plastic rather than an opaque material, while the indicia thereon such as 602 are of an opaque material. The rear lighting provided by the light source 238 shown in FIGURE 8 then provides particularly clear and distinctive sets of indica for viewing. As represented in the fragmentary sectional view in FIGURE 23, different colors of translucent material may be used for the different plate members 620, 622, 624 and 626 in the same magazine, or different colors may be used for plates in different magazines. Alternatively the plate may be made substantially entirely of opaque material and only the indicia made transparent, in which case the transparent indicia may be of different colors in different plates or in different magazines. Various other display systems employing various arrangements of colored plate members and colored lights may also be used.

In some applications the signals produced by operation of the control switches, selector switches, and magazine coding devices may be supplied to the input terminals of a computer, rather than to a matrix of controlled switches, In this case the signals produced by the control switches, selector switches and magazine coding devices will typically be passed first through an encoder for converting them to a form suitable for use by the computer. For example, the control switches may be assigned distinctive decimal numbers between 1 and 99, the selector switches being assigned different numbers between 1 and 9; a decimal number 185 may then be used to indicate actuation of selector switch No. 1 and control switch No. 85. In this example the encoder would be operative to produce, at four output terminals thereof, first the binary representation of 8 (i.e. 1000) and then the binary representation of 5 (i.e. 0101), showing that control switch No. 85 was actuated; and, next, the binary representation of 1 (i.e. 0001), indicating that selector switch No. 1 was actuated.

In the arrangements shown in detail herein, the apparatus for sensing and identifying the plate members and magazines and the arrangement for selecting the plate members are essentially mechanical in nature. However it will be understood that the sensing and identifying may be accomplished by other means, for example by photoelectric, optical or magnetic sensors; and that the plate members may be moved by solenoids remotely controlled by an operator or by a computer, for example. In the latter case the electrical selector switches need not be on the keyboard itself, and may have any of a variety of forms.

While the invention has been described with particular reference to specific embodiments thereof in the interests of complete definiteness, it will be appreciated that it may be embodied in any of a large variety of diverse forms without departing from the scope and spirit of the invention as defined by the appended claims.

We claim:
1. A switching system comprising:
a signal utilization device;
a first plurality of controllable transfer elements each having control terminals and each actuatable in response to application of a pair of control signals to said control terminals thereof to transfer signals to said signal utilization means for utilization therein;
a control keybord;
a plurality of control switches each having an actuating element therefor disposed on said keyboard;
means connecting each of said control switches to the control elements of a different set of N sets of said transfer elements;
a plurality of selector switches each having an actuating element therefor disposed on said keyboard;
means connecting each of said selector switches to the control elements of a different set of M sets of said transfer elements, said M sets differing from, but having transfer elements in common with, said N sets, whereby simultaneous operation of one of said selector switches and one of said control switches produces selective actuation of at least one of said transfer elements;
controllably-positionable indicia means on said keyboard for providing said actuating elements of said control switches with different sets of associated visible indicia for different positions of said indicia-bearing means; and
means responsive to actuation of any one of said selector switches to place said indicia-bearing means in a particular corresponding one of said different positions thereof, whereby there are automatically presented to view, in association with said control switch actuating elements, indicia appropriate to the control functions provided by said control switches when said one of said selector switches is actuated;
said keyboard comprising a magazine containing a plurality of elements bearing said indicia, means for freeing said magazine from said keyboard and for permitting replacement thereof, a coding structure on said magazine providing a code identifying said magazine, and means on said keyboard responsive to said coding structure for developing code-representing electrical signals having a form determined by said coding structure.

2. A system in accordance with claim 1, comprising a second plurality of controllable transfer elements for transferring signals to said signal utilization device in response to actuation of various combinations of one of said selector switches and one of said control switches; and additional electrically-controllable switch means responsive to said code-representing signals produced by said coding structure to render inoperative said second plurality of controllable transfer elements and responsive to another code-representing signal to render said second plurality of controllable transfer elements operative and said first plurality of controllable transfer elements inoperative.

3. Control keyboard apparatus, comprising:
a supporting frame;
a plurality of electrical control switches having their respective actuating elements supported on said frame;
a masking structure supported on said frame, said masking structure having a plurality of transparent regions arranged in a predetermined pattern and each associated with one of said control switches;

a plurality of indicia-bearing plate members each movably supported behind said masking structure and each bearing a set of indicia located thereon at positions arranged in accordance with said pattern of said transparent regions, so that said indicia on any one of said plate are visible through said transparent regions when said one plate member is in a particular position behind said masking structure;

a plurality of selector switches each having its actuating element supported on said frame;

electrical contacts responsive to operation of one of said actuating elements of said selector switches to operate said contacts;

means for moving any selected one of said plate members to said particular position thereof in which said indicia thereon are visible, in response to operation of the actuating element of a corresponding one of said selector switches;

means mounting said plate members in a stack behind said masking structure with their indicia-bearing surfaces adjacent and substantially parallel to each other, said indicia-bearing members being separately slidable parallel to their respective indicia-bearing surfaces, said indicia being sufficiently small relative to the portions of said masking structure between said transparent regions that each of said plate members can be slid between said particular position in which said indicia thereon are visible and a cleared position in which said indicia are obscured by said portions of said mask structure, and mechanical means responsive to actuation of any one of said operating elements of said selector switches to urge a particular corresponding one of said plate members to said particular position thereof and to urge others of said plate members to their cleared positions, at least all but one of said plate members having transparent regions therein which are aligned with each of said transparent regions in said masking structure when said plate members are in said cleared position;

binary digital identifying code elements on each of said plates and digital code reading means supported on said frame and positioned to produce code-representing electrical output signals only in response to said code elements on that plate member which is in its visible position.

4. Apparatus in accordance with claim 3, comprising a magazine for containing all of said plate members, said magazine being removable from said keyboard and insertable therein at will, said magazine having magazine-identifying coding elements thereon, said apparatus comprising code-reading means for developing code-representing output electrical signals indicative of the code represented by said code elements on said magazine when said magazine is in position in said keyboard.

5. Apparatus in accordance with claim 4, in which all of said plate members in said magazine contain apertures aligned with said transparent regions in said masking structure when each of said slides is in its cleared position, at least some of said plate members having indicia on both opposite surfaces thereof, said magazine having additional coding elements thereon positioned to be read by said code-reading means when said magazine is turned over in said keyboard.

6. Control keyboard apparatus comprising:
a supporting frame;
a masking structure on said frame having a plurality of transparent regions therein arranged in a predetermined pattern;
a plurality of electrical control switches on said keyboard, one adjacent each of said transparent regions;
a magazine containing a stack of plate member, supported on said frame behind said masking structure;
said plate members each having thereon a set of indicia-bearing regions and a set of transparent regions interspersed therewith, both said sets being arranged in accordance with said pattern so that in a first position of any of said plate members said indicia are obscured by said masking structure and in a second position thereof said indicia thereon are visible through said masking structure;
a plurality of selector switches having their respective actuating elements disposed on said keyboard;
means responsive to actuation of any one of said selector switches to slide a particular corresponding one of said plate members from said first to said second position thereof;
code-reading switch means secured to said frame, and first coded elements on said magazine positioned to contact said code-reading switch means when said magazine is in one of its operating positions in said frame.

7. Apparatus in accordance with claim 6, comprising second coded elements on said magazine positioned to contact said code-reading switch means when said magazine is placed in said frame in an operating position reversed from said one operating position thereof.

8. Control keyboard apparatus comprising:
a supporting frame;
a masking structure on said frame having a plurality of transparent regions therein arranged in a predetermined pattern;
a plurality of electrical control switches on said keyboard, one adjacent each of said transparent regions;
a magazine containing a stock of plate members, supported on said frame behind said masking structure;
said plate members each having thereon a set of indicia-bearing regions and a set of transparent regions interspersed therewith, both said sets being arranged in accordance with said pattern so that in a first position of any of said plate members said indicia are obscured by said masking structure and in a second position thereof said indicia thereon are visible through said masking structure;
a plurality of selector switches having their respective actuating elements disposed on said keyboard;
means responsive to actuation of any one of said selector switches to slide a particular corresponding one of said plate members from said first to said second position thereof;
code-reading means supported on said frame, and in which each of said plate members is provided with distinctive coding elements on a portion thereof adjacent said code-reading means, said code-reading means being positioned to be contacted by any of said plate members which is in said second position thereof.

References Cited
UNITED STATES PATENTS
2,432,324 12/1947 May _____________ 340—365 X
3,226,712 12/1965 Lens et al. _________ 340—365

THOMAS A. ROBINSON, *Primary Examiner.*